Nov. 25, 1969  W. GALKIN  3,479,911
STRAP FEED AND CUTOFF MACHINE
Filed June 27, 1966  4 Sheets-Sheet 2
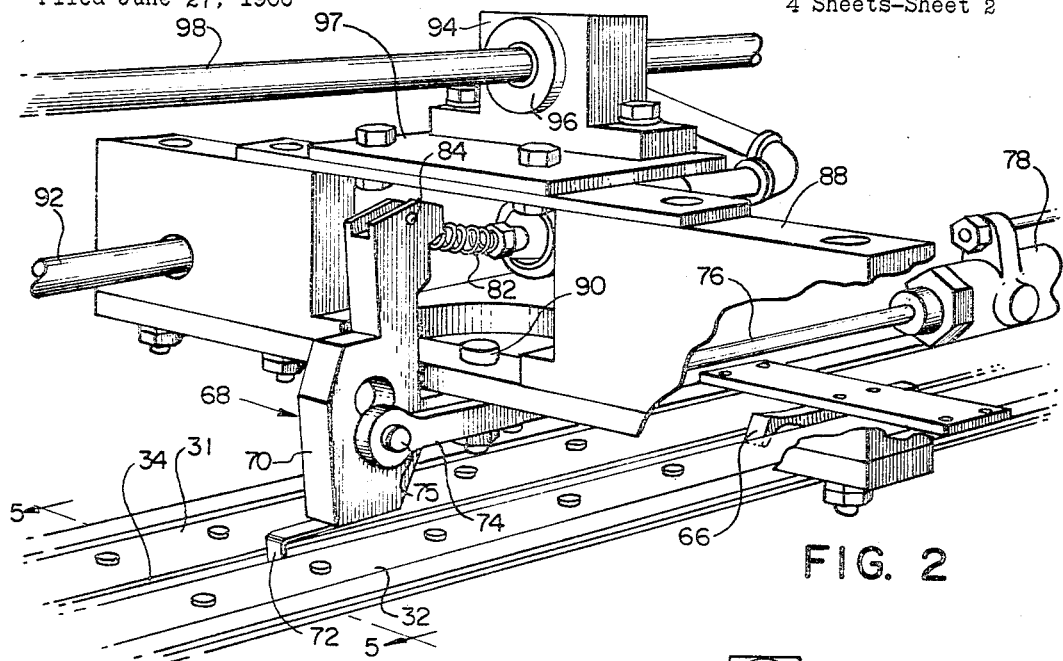
FIG. 2
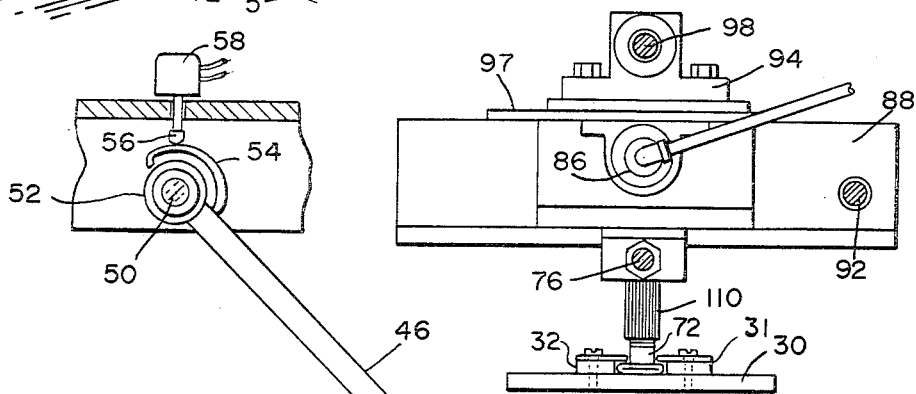
FIG. 6
FIG. 7
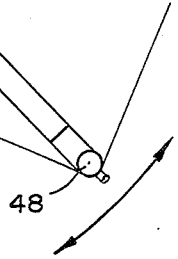
INVENTOR
WARREN GALKIN
BY
*Salter & Michaelson*
ATTORNEYS INVENTOR
WARREN GALKIN
BY
Salter & Michaelson
ATTORNEYS

United States Patent Office 3,479,911
Patented Nov. 25, 1969

3,479,911
STRAP FEED AND CUTOFF MACHINE
Warren Galkin, Providence, R.I.
(33 Factory St., West Warwick, R.I. 02893)
Filed June 27, 1966, Ser. No. 560,633
Int. Cl. B26d 5/20; B65h 25/14
U.S. Cl. 83—65
18 Claims

ABSTRACT OF THE DISCLOSURE

A machine for directing a continuously moving web of flexible material from a source and to a work station wherein predetermined lengths of the material are severed at the work station, means being provided and responsive to the feeding movement of the flexible material toward the work station for producing periodic severing of the material, and means for guiding the flexible material as it is received from the source toward the work station, including a movable member that is responsive to the feed of the flexible material for controlling operation of means for moving the flexible material toward the work station, the means for directing the material to the work station providing for a different rate of feed than the feeding movement of the material from the source, and means responsive to the different rate of feed of the material for controlling movement thereof toward the work station.

---

The present invention relates to a strap feed and cutoff machine. More particularly, the present invention relates to apparatus for receiving a continuously feeding length of flexible material after a processing thereof, and for directing the flexible material to a work station in an intermittent feeding movement at which it is severed into lengths of predetermined dimension.

It has been the usual practice heretofore in the processing of continuous lengths of flexible material such as straps for use in carry bags and the like, to direct the material from the station at which the processing took place to a winding station wherein the material was wound on a reel. Thereafter, if the continuous length of strap material was to be further processed such as by cutting it into selective lengths depending upon the end use thereof, the reel was mounted adjacent to a cutting machine and rotated for advancing the continuous length strap to the cutting machine for the severing thereof in the selected lengths. The prior known apparatus for processing and then severing the continuous length of material into the selective lengths was obviously time consuming and therefore relatively expensive to operate. The present invention avoids the intermediate step of winding the flexible material on a reel, as hereinabove discussed, and provides for directing the continuously moving flexible material from the source thereof or processing station to a work station at which the material is severed into the selected lengths as required.

Accordingly, it is an object of the present invention to provide apparatus for continuously feeding a length of flexible material from a source to a work station at which the material is further processed.

Another object of the invention is to provide apparatus for continuously feeding a flexible material from a source and for directing it to a work station, a guide means being provided for directing the flexible material from the source to the work station and enabling the material to be severed into selected lengths.

Still another object is to provide apparatus for feeding a continuous strap to a cutoff device, the feeding movement of the strap to the cutoff device being somewhat greater than the feeding movement thereof from its source, the difference in feed of the strap providing for severing of the strap into lengths of predetermined dimension by the cutoff device.

Still another object is to provide a strap feed and cutoff machine that includes means for periodically effecting a feeding movement of the strap as the strap is continuously fed from the source thereof, means being further included for severing the strap at selected intervals of the feeding movement thereof.

Still another object is to provide a strap feed and cutoff machine in which electrical circuitry is employed for controlling the operation of the feeding and cutoff operations.

Other objects, features and advantages of the invention will become apparent as the description thereof proceeds when considered in connection with the accompanying illustrative drawings.

In the drawings which illustrate the best mode presently contemplated for carrying out the present invention:

FIG. 2 is an enlarged perspective view of the feeding mechanism for the strap that is adapted to move the strap to the cutoff station;

FIG 6 is a rear elevational view of the feeding mechanism with portions shown in section;

FIG. 7 is a fragmentary sectional view of the frame of the apparatus illustrating the position of the guide arm and cam associated therewith;

Figure 1:
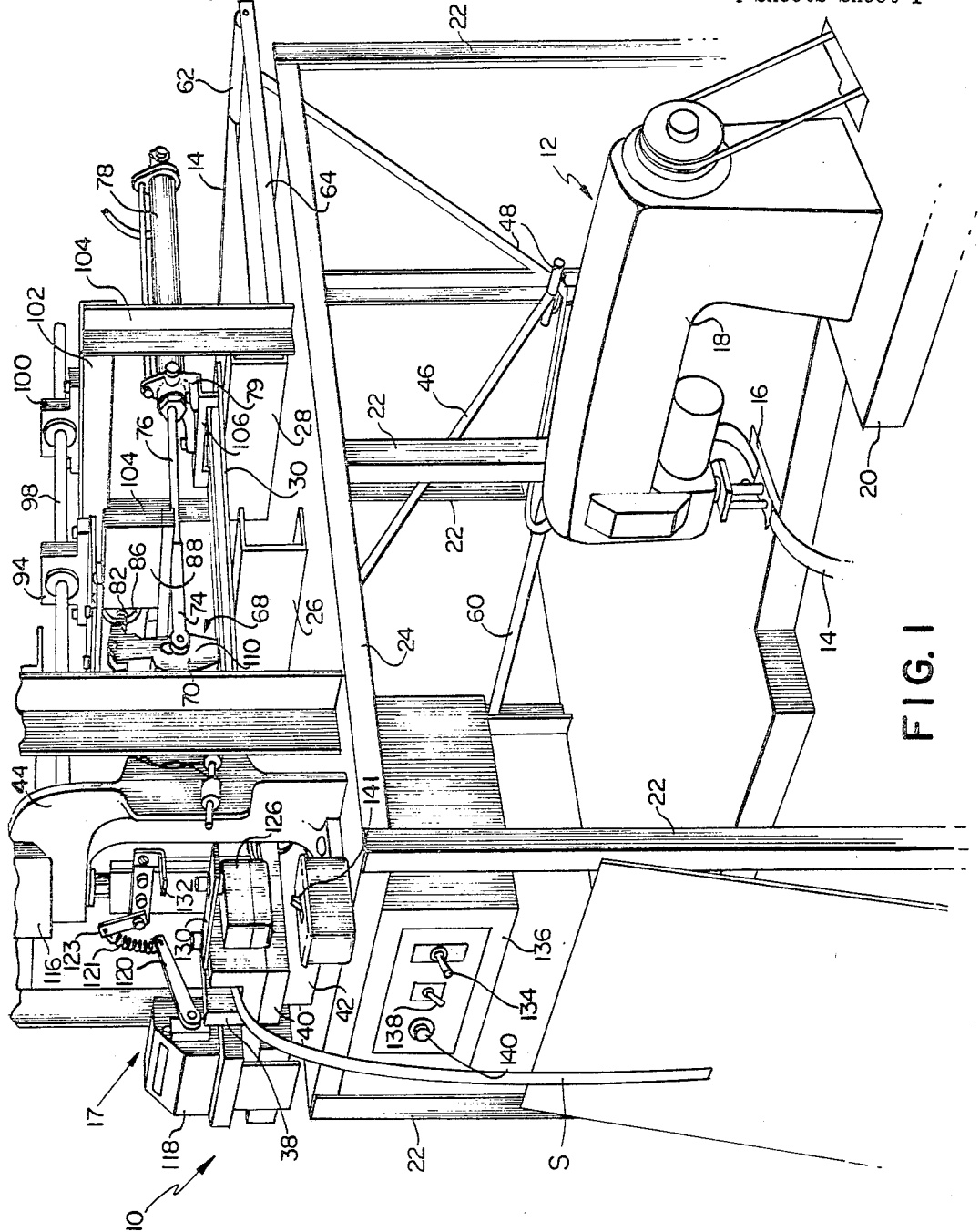
FIG. 1 is a perspective view of the strap feed and cutoff machine embodied in the present invention.

Referring now to the drawings and particularly to FIG. 1, the strap feed and cutoff machine embodied herein is generally indicated at 10. As presently contemplated, the machine 10 is designed for use in the feeding of flexible strap material from a source or processing station such as a sewing machine that is generally indicated at 12. Although any required operation may be performed on the strap material, the sewing machine 12 as herein employed is designed to sew the longitudinal edges of the material so as to form continuously bound edges. In this form, the strap indicated at 14 is adapted to be cut into preselected lengths that are used in various kinds of carrying bags or receptacles. As described herein, the kind of material from which the strap 14 is formed is not significant. However, for purposes of illustration, the strap as presently contemplated for use is fabricated of a flexible plastic material. It is understood that although the strap feed and cutoff machine 10 is designed for use as described herein with a sewing machine, the concept of the apparatus may be employed with other devices without departing from the spirit and scope of the invention.

In use of the apparatus, the strap 14 is fed by an operator into a jig on the sewing machine 12 which directs the strap under a foot 16 in the conventional manner. As described, the edges of the strap 14 are adapted to be turned and sewn thereby forming opposed bound edges, as is the conventional practice in the manufacture of straps. Since the sewing machine 12 is designed to be automatically operated and thereby continuously feeds the processed strap 14 outwardly therefrom, the machine 10, as will now be described, is designed to receive the continuously moving strap 14 and directs it to a cutoff station generally indicated at 17 for severing the strap into lengths of selected dimension. As further shown in FIG. 1, the sewing machine 12, which includes a suitable housing 18, is mounted on a table 20 adjacent to the machine 10 and may include any form of conventional sewing mechanism required for binding the edges of the strap 14.

Figure 5:
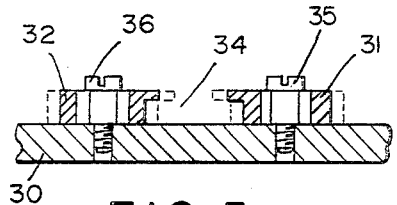
FIG. 5 is a sectional view taken along lines 5—5 in FIG. 2.

The machine 10 as described is adapted to direct the strap 14 from the sewing machine 12 to the cutting station 17 for the severing of the strap in selected lengths and for this purpose includes a frame defined by spaced legs or standards 22 on which a base plate 24 is mounted. Fixed on the base plate 24 are spaced horizontally disposed rail supports 26 and 28, on which a longitudinally extending plate 30 is mounted. As shown in FIG. 5, channel guides 31 and 32 are mounted on the plate 30 by fastening bolts 35 and 36 and cooperate with the plate 30 to define a longitudinally extending channel 34. It is through the channel 34 that the strap 14 extends during the feeding movement thereof to the cutting station 17, and as seen in FIG. 5, the guides 31 and 32 may be laterally shifted to adjust the width of the channel 34 by movement of corresponding fastening bolts 35 and 36, respectively.

Located at the forward end of the plate 30 at the work or cutoff station 17 is a channel block 38 that communicates with the channel 34 and to which the strap 14 is moved for the cutting operation. The channel block 38 is supported by a plate 40 that is mounted on the foot portion 42 of a C-shaped support bracket 44. As seen in FIG. 1, the support bracket 44 is fixed to the plate 24 by suitable bolts that extend through the foot portion 42.

The strap 14 is fed continuously by the sewing machine 12 toward the rearmost end of the machine 10 and is guided thereto by a pivotally mounted guide arm 46, on the outermost end of which a bar 48 is fixed. As illustrated in FIG. 7, the arm 46 is pivoted on the frame of the machine 10 and beneath the plate 24, a pivot pin 50 extending through the inner end of the arm 46 that is enlarged as indicated at 52. The enlarged inner end 52 of the arm 46 is provided with a cam surface 54 that engages a follower 56 of a switch 58. The purpose of the switch 58 and the association thereof with the guide arm 46 will be described hereinafter.

As the strap 14 is fed continuously from the sewing machine 12, it moves over a guide bar 60 mounted between the middle standards 22 of the frame and then is directed to the guide arm 46 in a predetermined loop from where it is directed to the rear end of the machine 10 for engagement with a guide roll 62. The guide roll 62 is conveniently mounted between extension brackets 64 that are secured to the base plate 24. As seen in FIG. 1, the strap 14 extends over the guide roll 62 and then is fed into the guide channel 34 defined by the channel guides 31 and 32. Referring to FIG. 2, a brake or a pressure finger 66 is shown fixed over the plate 30 and extends into the channel 34 for engagement with the strap 14 moving therein. The pressure finger or brake 66 which is formed of a polyurethane material is adapted to apply uniform tension on the strap as it moves within the channel 34 and thereby assures that the strap as directed to the cutting station 17 will be sufficiently tensioned, whereby the individual straps as cut into lengths will be of uniform dimension. The pressure finger 66 also acts to prevent the strap from being withdrawn from the channel 34 by the weight of the guide arm 46 that is exerted on the strap.

Figure 4:
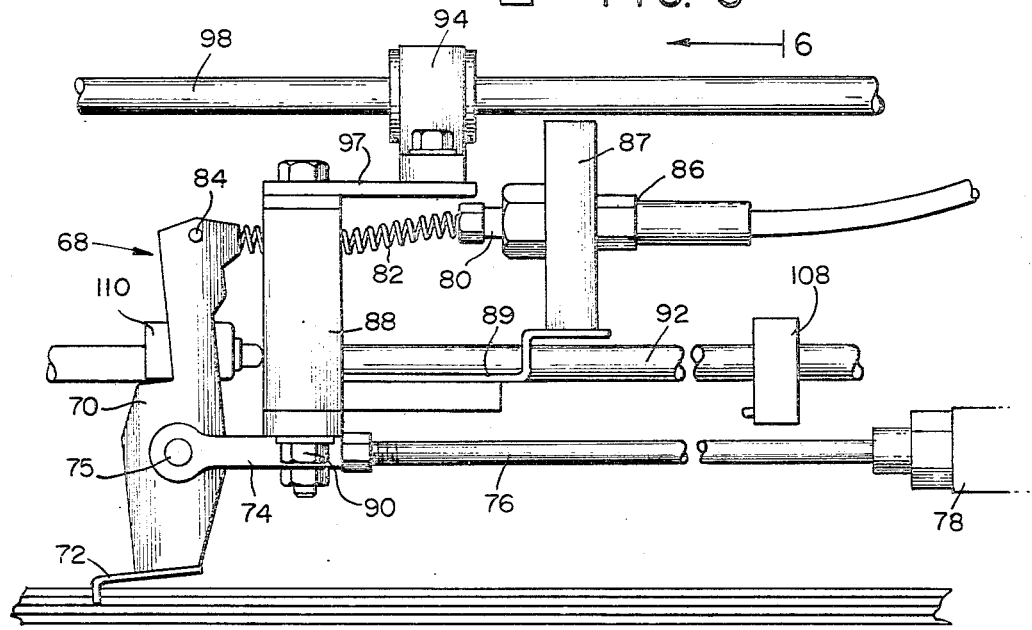
FIG. 4 is a side elevational view of the feeding mechanism illustrated in FIG. 2 and showing the feed member at the forward end of the stroke thereof.

In order to periodically move the strap 14 to the cutting station 17 at the forward end of the apparatus 10, a feed member generally indicated at 68 is provided and includes a feed block 70 to the lower end of which a feed dog 72 is secured. As best illustrated in FIGS. 2 and 4, the feed dog 72 extends into the channel 34 for engagement with the strap 14 during the feeding operation thereof toward the cutting station 17. In order to provide for movement of the feed dog 72 into the channel 34, the feed block is mounted for pivotal movement on a pivot pin 75 that extends through the forward end of spaced arms 74 that, in turn, are fixed to the underside of a cross member 88 by a bolt 90.

As illustrated in FIG. 4, a piston rod 76 is interconnected to the arms 74 and extends into a feed cylinder 78, the purpose of which is to provide for movement of the feed member 68 in a feeding stroke. Referring again to FIG. 1, the feed cylinder 78 is shown fixed on the frame by a fitting 79 that is secured to a bracket 106.

In order to pivotally move the block 70 on the pivot pin 75 so as to move the feed dog 72 into engagement with the strap 14 that is disposed in the channel 34, the uppermost end of the block 70 is interconnected to a piston rod 80 through a tension spring 82. The tension spring 82 is fixed to a bifurcated portion of the upper end of the block 70 by a pin 84 and the piston rod 80 extends into a cylinder 86 for interconnection to a piston therein. The cylinder 86 is movable with the cross member 88 and feed member 68 and is carried by a support 87 that, in turn, is mounted on a bracket 89. As shown in FIG. 4, the bracket 89 is joined to the cross member 88 and is movable therewith.

During the feeding operation of the strap 14, the feed member 68 is adapted to be moved in a direction toward the cutting station 17. For this purpose, the feed member 68 is interconnected to the cross member 88 to which the arms 74 are also fixed by means of the bolt 90. The cross member 88 is conveniently mounted for movement on a longitudinally extending fixed rod 92 and has a bearing block 94 fixed thereon at the upper end thereof in which a bearing member 96 is located. The bearing member 96 is fixed on a support plate 97 which as shown in FIGS. 2 and 4 is mounted on the uppermost end of the cross member 88. Extending through the bearing member 96 is a support rod 98 that further guides the movement of the cross member 88 during the feeding operation. As indicated in FIG. 1, the support rod 98 is fixed to the bracket 44 at the forward end thereof and is mounted in a support block 100 that is, in turn, fixed on a horizontal support 102. The horizontal support 102 is mounted on vertical supports 104 that are located in vertical relation on the base plate 24, and are secured to the horizontal rail support 28. As further seen in FIG. 2, the cross member 88 is split in two portions to define a central opening therein through which the spring 82 extends for interconnecting the upper end of the feed member 68 to the piston rod 80 of the feed dog cylinder 86.

In the operation of the device, the strap 14 is intermittently moved to the cutting station 17 by the piston rod 76 as it moves in a forward direction upon de-energizing of the solenoid that controls the operation thereof. The piston rod 76 is thus released to carry the cross member 88 and the feed member 68 secured thereto forwardly, the cross member 88 and feed member 68 being returned by the piston rod 76 in a rearwardly direction when the piston rod 76 is retracted within the cylinder 78 upon energizing of the solenoid that controls operation of the cylinder 78.

The operation of the feed cylinder 78 and the feed dog cylinder 86 is controlled electrically, and for this purpose, a rear limit switch 108 and a forward limit switch 110 are provided. It will be noted, as seen in FIG. 4, that the cross member 88 will engage the forward limit switch 110 at the forwardmost end of the travel thereof, while the limit switch 108 is engaged by the cross member 88 when it is moved to the rearmost end of the travel thereof by the piston rod 76.

Figure 3:
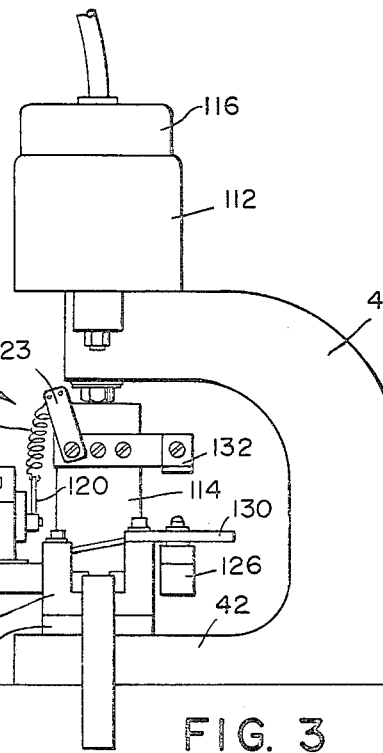
FIG. 3 is a front elevational view of the apparatus.

The cutting station 17 which is illustrated at the forward end of the apparatus 10 includes the C-shaped support bracket 44, on the foot portion 42 of which the channel block 38 is mounted. Also secured to the support bracket 44 is a cylinder 112 that controls the operation of a cutting device 114 operatively interconnected thereto. A solenoid valve 116 is mounted on the support member 44 and is adapted to control the operation of the cylinder 112 and consequently the movement of the cutting device 114. If desired, a counter 118 may also be mounted on the forward portion of the apparatus at the cutting station, and in the form of the invention as illustrated in FIGS. 1 and 3, the counter 118 includes an arm 120 that is interconnected to the cutting device 114 through a spring 121 and a lever 123 and is responsive to the movement of the cutting device for indicating a cutting operation. The counter 118 may be so arranged and devised that upon a predetermined number of cutting operations the machine 10 and the sewing machine 12 will be automatically shut off.

In order to further control the operation of the cutting device 114, a switch 126 is located adjacent thereto and is fixed to a plate 130 that is, in turn, secured to the channel block 38. Secured to the upper end of the cutting device 114 is a actuating member 132 that is adapted to actuate the switch 126 upon the downward travel of the cutting device 114 during the cutting stroke thereof. As further shown in FIG. 1, a control box 136 is secured to the underside of the base plate 24 and has located therein an electrical control system that provides for selectively determining the length of the strap to be cut. In this connection, a double pole, double throw toggle switch 134, a selector switch 138 and a signal light 140 are located on the forward panel of the box 136. As will be described the toggle switch 134 is operable to complete a circuit for placing the stepping relay circuit in condition for operation. Also mounted at the forward end of the machine adjacent to the cutting station 17 is an on-off switch 141 that communicates with a source of line current. In the operation of the device, the sewing machine 12 is adapted to continuously process the strap 14 fed thereto, and in this connection, the edges of the strap are sewn in bound relation. The sewn strap is thereafter moved over the guide rod 60 and then downwardly over the outer bar 48 of the arm 46. From the arm 46 the strap 14 is directed to the guide roll 62 for guiding into the channel 34 defined by the channel guides 31, 32 that are fixed on the frame of the machine. As will now be described the strap 14 is fed in intermittent steps through the channel 34 and toward the cutting station 14 at which it is severed into lengths of predetermined dimension. Thus, the cutting device 14 is actuated at selected intervals to cut the strap into the lengths of predetermined dimension.

Figure 8:
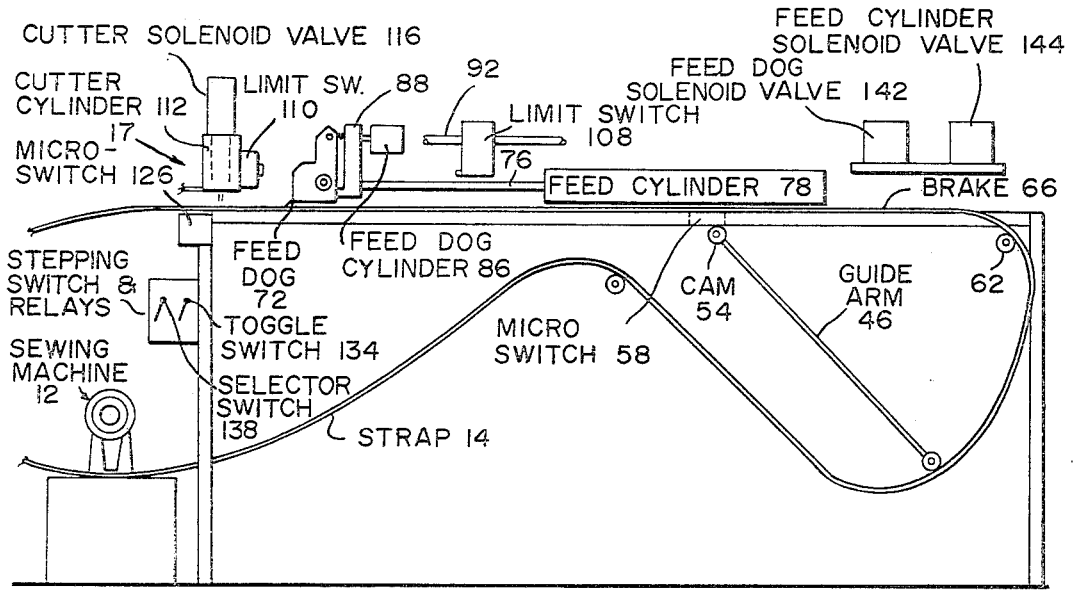
FIG. 8 is a diagrammatic illustration of the apparatus embodied herein.
Figure 9:
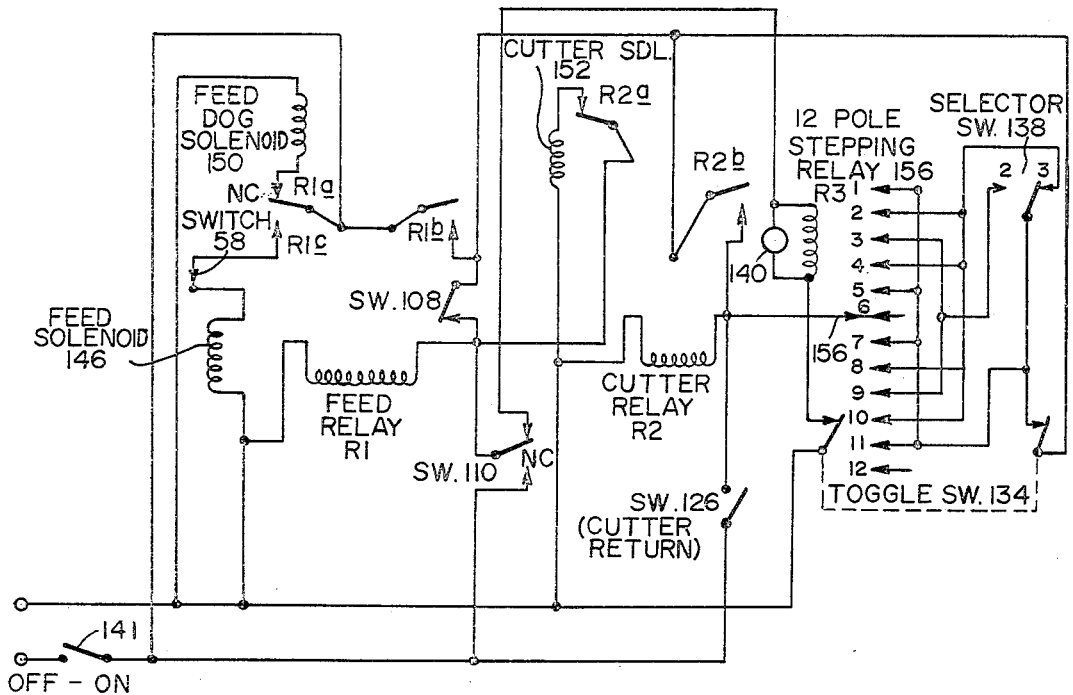
FIG. 9 is a circuit diagram of the electrical control circuit for the apparatus.

Referring now to FIGS. 8 and 9, the operation of the apparatus will now be described in detail with reference being made to the electrical circuitry that is operable to control the various components of the apparatus. As shown in FIG. 8, the machine 10 is illustrated diagrammatically and thus for purposes of illustration and the description herein, a feed dog solenoid valve 142 and a feed cylinder solenoid valve 144 are shown mounted over the frame of the machine. The feed dog solenoid valve 142 controls the operation of the feed dog cylinder 86, while the feed cylinder solenoid valve controls the operation of the feed cylinder 78. It is understood that the electro-hydraulic operation of the solenoid valves 142 and 144 is conventional and will move the feed dog 72 and cross member 88 in the required manner upon energization of the solenoids associated therewith.

As previously described, during a feeding operation, the feed dog 72 is moved into engagement with the strap 14 that is located in the channel 34. Also during the feeding operation, the piston rod of the feed cylinder 78 is normally moved forwardly toward the cutting station 17 when the solenoid of the feed cylinder solenoid valve 144 is de-energized. Conversely, the feed cylinder 78 will act to retract the feed dog 72 and the cross member 88 when the feed cylinder solenoid valve 144 is energized.

Assuming now that the feed cylinder 78 is operating to move the feed dog cylinder 86 and the feed dog 72 forwardly with the cross member 88, then the feed solenoid indicated at 146 in FIG. 9 is de-energized since in the retracted position of the feed cylinder 78 the limit switch 108 is actuated by the cross member 88 to open the circuit to the feed relay indicated at R1 in FIG. 9. When the feed relay R1 is de-energized upon removal of the cross member 88 in engagement with the switch 108, the normally closed relay contact R1a acts to complete a circuit to the feed dog solenoid 150 for operating the feed dog solenoid valve 142. This causes the piston 80 to move forwardly thereby pivoting the block 70 and forcing the feed dog 72 into clamping engagement with the strap 14. Thus, as the piston rod 76 moves forwardly to its normally distended position, upon de-energization of the feed relay R1, the cross member 88 and feed member 68 interconnected thereto are also carried forwardly toward the cutting station 17, thereby producing a feeding movement of the strap 14.

When the cross member 88 together with the feed dog 72 and feed dog cylinder 86 reach the forward position, the switch 110 is actuated to close the circuit to the feed relay R1, thereby opening contact R1a and closing R1b. A circuit is then completed through the switch 58 that is located in a normally closed position. The machine 10 is arranged such that the feed stroke and the cutting operation is slightly greater than the feed of the strap 14 from the sewing machine 12. Thus as the strap 14 is fed to the cutting station, any slack in the strap that has accumulated as the strap is fed from the sewing machine to the feed and cut-off machine 10 will be taken up. As the strap is tensioned during the feeding thereof to the cut-off station 17 the guide arm 46 pivots in a counter-clockwise direction as seen in FIG. 7. When the guide arm reaches the position wherein the raised portion of the cam surface moves the follower 56, the switch 58 is tripped for movement to the open position. As seen in FIG. 9, when the switch 58 opens, the circuit to the feed solenoid 146 is broken. Even though the feed solenoid is de-energized the feed stroke of the feed piston rod 76 remains unaffected since de-energizing of the feed solenoid causes the piston rod 76 to move forwardly to its normally extended position. As will be described this movement carries the feed member 68 in a feed stroke to advance the strap toward the cutting station 17. At this point, the feed solenoid 146 remains de-energized but the sewing machine 12 continues to feed thereby building up a slack in the strap 14 between the sewing machine 12 and the machine 10. When sufficient slack in the strap 14 is obtained to permit the guide arm 46 to return to the position shown in FIG. 7, the switch 58 is released for movement to the normally closed position and the circuit is completed through the feed solenoid 146, contact R1c, contact R1b and switch 108. The feed cylinder solenoid valve 144 is then operated to positively move the piston within the feed cylinder 78 rearwardly for retracting the cross member 88 and the feed dog 72 therewith. When the switch 58 closes, the feed dog solenoid 150 is de-energized since contact R1a is opened, the feed dog 72 thus being retracted from engagement with the strap and permitting the withdrawal of the feed dog 72 with the cross member 88 and feed dog cylinder 86. As the piston rod 76 retracts the cross member 88, switch 110 opens, but the normally closed switch 108 acts to hold in the relay R1 through R1b.

For purposes of illustration, it is first assumed that the cutting device 114 will be operated on every stroke, although in actual practice this is not the case. Normally, the cutting device 114 is retained in the upper position thereof, and upon closing of the circuit to the feed relay R1, the cutter solenoid indicated at 152 is energized through the circuit completed by the contact R1b to move the cutter downwardly in a cutting stroke. However, it is not necessary that the strap 14 be severed on every feeding movement occasioned by operation of the feed cylinder solenoid valve 144, and thus, a cutter relay R2 is provided together with a twelve-pole stepping relay R3 and the selector switch 138 for preventing operation of the cutter solenoid 152 until the strap has reached a predetermined length at the cutting station 17.

Assuming that the length of strap to be obtained requires the feed cylinder 78 to stroke two times to obtain the required length of strap indicated at S in FIG. 1, the toggle switch 134 is first placed in the "on" position, thereby connecting the relay coil of the twelve-pole stepping relay R3 in circuit with this switch. Since the toggle switch 134 is a double-pole, double-throw type of switch, movement thereof to the "on" position further locates the moving contact of the selector switch 138 in the circuit. As seen in FIG. 9, the stepping relay R3 includes twelve contacts and a moving or stepping contact indicated at 156. The stepping contact 156 is mechanically moved upon energization of the coil of the relay R3. Thus, on each pulse of the coil when a circuit to the coil is completed, the stepping contact 156 will be moved one step, as is conventional in this type of switch. Thus, the stepping contact 156 advances one step when the feed cylinder 78 returns to the retracted position and permits the switch 110 to return to its normally closed position. This completes the circuit to the stepping relay. The selector switch 138 includes two contacts indicated at 2 and 3, each contact being located in the stepping relay circuit but arranged so as to permit operation of the cutter solenoid on either two or three feeding movements of the piston rod 76. Thus a shorter strap will be obtained if the selector arm rests on No. 2 in the switch 138 than if it were on No. 3. When the selector switch 138 is at position 2, power flows from the feed relay R1 to the stepping switch contacts 1, 3, 5, 7, 9 and 11; and when the selector switch is in position 3, power flows to the contacts 1, 2, 4, 5, 7, 8, 10 and 11. It will be observed that when the moving contact 156 is on contacts 6 and 12, power will not flow through the circuit and there will be a cutting stroke. When the moving or stepping contact 156 of the stepping relay R3 is located on an energized contact, relays R1 and R2 energize substantially simultaneously so as to prevent the cutter solenoid 152 from energizing. Actually, the feed relay R1 will energize to begin a stroke of the cutting device since the cutter solenoid 152 will be energized, but simultaneously therewith as the cutter relay R2 is energized, the contact R2a will open to prevent operation of the cutting device. Thus, when it is necessary to prevent a cutting stroke, the cutter relay R2 is energized through the stepping relay contact 156.

It is seen that the operation of the machine is automatic, and once the selector switch 138 has been set and the toggle switch 134 moved to the "on" position, the circuit will be energized to cause the operation of the device as described. Although not mentioned above, it will be noted that when the cutting device 114 moves to the lower position thereof in a cutting stroke, the switch 126 will be closed, thereby completing the circuit through the cutter relay R2 and closing contact R2b and opening contact R2a. The cutter solenoid 152 is then de-energized to cause the cutting device 114 to be retracted.

It is seen that the machine set forth and described herein receives the strap 14 directly from the sewing machine without any requirement for slowing the operation of the sewing machine during the severing of the strap into the selected lengths. Thus, the intermediate step of winding the strap from the sewing machine is avoided, and the strap is directed to the cutting station for the severing thereof with a minimum of time elapsed. The use of the guide arm 46 provides a simple solution for maintaining the required feed from the sewing machine to the cutting station 17. Thus, the guide arm 46 maintains a minimum of tension on the strap 14 as it is moved from the sewing machine and requires no adjustment for different lengths of the strap to be cut or for different sewing machine speeds. In operation the feed of the strap to the cutting station 17 is slightly greater than the feed of the strap from the sewing machine, causing the guide arm 46 to be pivoted in the clockwise direction as seen in FIG. 7. Once the guide arm reaches the position where the cam surface 54 trips the switch 58, the feed solenoid 146 will be de-energized and the feed of the strap to the cutting station is temporarily interrupted. However, since the sewing machine is operating continuously, the strap will begin to accumulate at the guide arm, permitting the guide arm to pivot clockwise as seen in FIG. 7, thereby closing the circuit to the feed solenoid 146 once again.

When the strap material that is being fed to the sewing machine is nearly run out of the reel on which it is mounted, the guide arm 46 further acts to discontinue the feeding operation of the strap to the cutting station. Although not shown, a sewing machine tending device is incorporated therein in conjunction with the strap feed reel. The tending device is controlled to sense the exhausting of the strap from the feed reel and to cut off the sewing machine just before the strap end runs through the sewing machine. Although the sewing machine is cut off at the point, the machine 10 continues to operate and the remaining portion of the strap in the machine 10 is fed to the cut-off station 17. However, when the guide arm 46 moves to the upper pivoted position to actuate the switch 58, it will remain in this position since no strap is being fed by the sewing machine. Thus, until the sewing machine begins feeding the strap from the new reel mounted thereon, the switch 58 will remain in the "off" position and the feed solenoid 146 will be de-energized. It will be apparent that the guide arm 46 and switch 58 cooperate to insure that always enough strap is available for cutting a strap of required length and furthermore provide for continuing the cutting operation without resetting any controls regardless of when the machine was cut off.

It is further seen that the tension device 66 cooperates with the guide arm 46 to properly tension the flexible strap 14 as it is moved within the channel 34 to the cutting station 17. Thus, the tension device 66 prevents the material from being pulled back by the weight of the guide arm 46 and further acts to properly tension the material between the rear location of the strap and the cutting station 17 as the strap is moved to the cutting station. Further, since the strap is formed of a flexible material, the required tension is always maintained during the cutting operation.

Although the length of the strap to be cut is determined by the control of the cutting device 114 through the toggle switches 134 and 138, fine adjustment for obtaining the required length of each strap as severed is determined by longitudinal shifting of the limit switch 108 along the rod 92. Any convenient means such as a set screw may be employed for locking the limit switch 108 to the rod 92 after the proper adjustment has been made.

It is also contemplated to feed and cut off lengths of a relatively soft material that could not be advantageously advanced to the cutting station through a horizontal feed channel as illustrated and described hereinabove. In this connection, it is contemplated that a vertical feed channel will be employed for receiving the length of soft material therein. The vertical feed channel will provide for an effective feed to the cut-off station and in order to retain the soft material within the vertical feed channel, air jets may be utilized and will be located adjacent to the vertical channel. The air jets not only will help retain the soft material in the vertical feed channel but will also act to induce a feeding movement thereof together with the feed dog as described.

While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In apparatus for directing a web of flexible material to a work station, means for uninterruptedly feeding said web of flexible material from a source in a continuous length, means for receiving said web of flexible material from said source and guiding it toward said work station in a continuous length, means for periodically engaging the flexible material in clamping relation at a point along the length thereof, means for moving said engaging means after the clamping thereof on said flexible material, in a direction toward said work station for effecting a positive periodic feeding of said flexible material toward said work station, said guiding means including a movable member that is responsive to the feed of said web for controlling operation of said means for moving said engaging means, means responsive to the feeding movement of said flexible material toward said work station for producing a periodic working operation on said material at said work station, and means for removing the engaging means from engagement with said material and for withdrawing said engaging means to the position for producing the next positive feeding movement of said material after the working operation has been completed.

2. In apparatus as set forth in claim 1, a cutting device located at said work station, means selectively operable to activate said cutting device after a predetermined length of said material has been fed to said cutting station by said moving means, wherein said cutting device severs said web of flexible material to produce a predetermined length of said material.

3. In apparatus as set forth in claim 1, said engaging means including a clamping member and a device that is periodically operable to actuate said clamping member for moving it into clamping engagement with said web of flexible material, said moving means including a moving member that is interconnected to said clamping member and means for periodically actuating said moving member for moving said clamping member and flexible material clamped in engagement thereby in an operating stroke toward said work station.

4. In apparatus as set forth in claim 2, means for controlling the operation of said cutting device for selectively cutting the web of flexible material to the predetermined lengths required.

5. In apparatus as set forth in claim 4, said controlling means including a selector switch and a stepping relay located in electrical communication with a cutter relay, said cutter relay being responsive to operation of said selector switch and stepping relay for controlling operation of said cutting device.

6. In apparatus as set forth in claim 3, a frame, spaced guide members mounted on said frame and defining a guide channel therebetween that extends substantially the length of said frame, said web of flexible material being received in said channel for movement therein, said clamping member projecting into said channel for engagement with said flexible material and being movable in said channel by said moving means in the operating stroke toward said work station.

7. In apparatus as set forth in claim 3, said periodically operable device including a cylinder that is responsive to a solenoid operated valve, a piston located in said cylinder and being interconnected to said clamping member, wherein energizing of said solenoid results in clamping movement of said clamping member into engagement with said flexible material.

8. In apparatus for directing a web of flexible material to a work station, means for uninterruptedly feeding said web of flexible material from a source in a continuous length, means for receiving said web of flexible material from said source and guiding it toward said work station in a continuous length, means for periodically engaging the flexible material in clamping relation at a point along the length thereof, means for moving said engaging means after the clamping thereof on said flexible material, in a direction toward said work station for effecting a positive periodic feeding of said flexible material toward said work station, and means responsive to the feeding movement of said flexible material toward said work station for producing a periodic working operation on said material at said work station, means for removing the engaging means from engagement with said material and for withdrawing said engaging means to the position for producing the next positive feeding movement of said material after the working operation has been completed, said engaging means including a clamping member and a device that is periodically operable to actuate said clamping member for moving it into clamping engagement with said web of flexible material, said moving means including a moving member that is interconnected to said clamping member and means for periodically actuating said moving member for moving said clamping member and flexible material clamped in engagement thereby in an operating stroke toward said work station, said periodically operable device including a cylinder that is responsive to a solenoid operated valve, a piston located in said cylinder and being interconnected to said clamping member, wherein energizing of said solenoid results in clamping movement of said clamping member into engagement with said flexible material, said periodically actuating means including a second solenoid valve and a second cylinder that is operable in response to said second solenoid operated valve, a piston located in said second cylinder and said moving member being joined to said piston located in said second cylinder and being normally movable in an operating stroke toward the work station when the circuit to the solenoid of said second solenoid valve is opened, said first solenoid being energized in response to opening of the circuit to the solenoid of said second solenoid valve to cause said clamping member to engage said flexible material as said moving member is moved toward the work station in an operating stroke.

9. In apparatus as set forth in claim 8, a cutting device located at said work station, and means operable in response to movement of said clamping member toward said work station in an operating stroke for periodically actuating said cutting device to sever said flexible material in lengths of predetermined dimension.

10. In apparatus as set forth in claim 9, means for controlling the operation of said cutting device for selectively cutting the flexible material to the required predetermined lengths.

11. In apparatus as set forth in claim 10, said controlling means including a cutter relay and a solenoid actuated valve with which a third cylinder communicates, a selector switch and a stepping relay located in electrical communication with said cutter relay, said cutter relay being responsive to the position of said selector switch and operation of said stepping relay for controlling the operation of the cutting device.

12. In apparatus as set forth in claim 9, said guiding means including a pivotally mounted arm over the end of which the flexible material extends as it is continuously fed from the source thereof, the feeding movement of said moving means being somewhat faster than the feeding movement of said material from its source, wherein the arm is maintained in an angular pivoted position, and means responsive to the pivotal location of said arm for controlling the operation of said moving member.

13. In apparatus as set forth in claim 12, a cam mounted on the inner end of said arm and a switch located adjacent to said arm and engageable by said cam for controlling the operation of said second solenoid operated valve, wherein when the feed of said flexible material from said source is discontinued, said cam actuates said switch to open the circuit to the solenoid of the second solenoid valve.

14. In apparatus for directing a web of flexible material to a work station, means for uninterruptedly feeding said web of flexible material from a source in a continuous length, means for receiving said web of flexible material from said source and guiding it toward said work station in a continuous length means for periodically engaging the flexible material in clamping relation at a point along the length thereof, means for moving said engaging means after the clamping thereof on said flexible material, in a direction toward said work station for effecting a positive periodic feeding of said flexible material toward said work station, means responsive to the feeding movement of said flexible material toward said work station for producing a periodic working operation on said material at said work station, means for removing the engaging means from engagement with said material and for withdrawing said engaging means to the position for producing the next positive feeding movement of said material after the working operation has been completed, said guiding means including an elongated pivotally mounted arm over the outer end of which the web of material extends as it is continuously fed from said source, the feeding movement of said moving means being somewhat faster than the feeding movement of said material from said source, wherein the arm is maintained in an angular pivoted position, and means responsive to the arm remaining in the angular pivoted position for controlling the operation of said means for moving said engaging means.

15. In apparatus for processing a continuous length of flexible material, means for continuously feeding said flexible material from a source in the continuous length thereof, means for guiding said material as it is fed from the source, means for receiving said material from said guiding means and for directing it to a work station at a rate that is somewhat greater than the feeding movement of the material from the source, and means responsive to the different rate of feed of said material for controlling the movement thereof toward said work station, said guiding means including a pivotally mounted arm over which the flexible material extends, and said controlling means including switch means that is responsive to pivotal movement of said arm, said arm being pivotally movable in response to the different rate of feeding movement of said flexible material for actuating said switch means, wherein the receiving and directing means is deactivated periodically to enable the feeding means to supply sufficient length of said flexible material for movement thereof to said work station.

16. In apparatus for processing a continuous length of flexible material, means for continuously feeding said flexible material from a source in the continuous length thereof, means for guiding said material as it is fed from the source, wherein said material is caused to have a predetermined loop, means for receiving said material from said guiding means and for directing it to a work station at a rate that is somewhat greater than the feeding movement of the material from the source, and means responsive to the different rate of feed of said material for controlling the movement thereof toward said work station, wherein the feeding movement of said flexible material to said work station by said receiving and directing means causes said loop to be reduced beyond its predetermined position, and means responsive to the reducing of the loop beyond its predetermined position for discontinuing operation of said receiving and directing means.

17. In apparatus as set forth in claim 16, means for controlling operation of receiving and directing means, and said discontinuing means including a pivotally mounted arm that is movable in response to the tensioning of said flexible material for effecting operation of said controlling means.

18. In apparatus for processing a continuous length of flexible material, means for continuously feeding said flexible material from a source in the continuous length thereof, means for guiding said material as it is fed from the source, means for receiving said material from said guiding means and for directing it to a work station at a rate that is somewhat greater than the feeding movement of the material from the source, means responsive to the different rate of feed of said material for controlling the movement thereof toward said work station, said guiding means including a movable member with which the flexible material makes engagement and that is responsive to the feed of said flexible material for controlling operation of said controlling means, means at said work station for performing a working operation on said flexible material, and means for controlling operation of said means at said work station so that the working operation is performed on said flexible material at predetermined intervals, said means for controlling operation of said means at said work station including a selector switch and a stepping relay located in electrical communication with a cutter relay, said cutter relay being responsive to operation of said selector switch and stepping relay for controlling operation of said means for performing a working operation.

References Cited

UNITED STATES PATENTS

| | | | |
|---|---|---|---|
| 2,156,049 | 4/1939 | Boerger | 83—236 X |
| 2,467,740 | 4/1949 | Haller | 226—162 X |
| 2,720,261 | 10/1955 | Koch | 83—250 X |
| 2,736,378 | 2/1956 | Sigoda et al. | 83—234 |
| 2,934,987 | 5/1960 | Rauline | 226—44 X |
| 3,052,143 | 9/1962 | Cooley | 226—163 X |
| 3,353,730 | 11/1967 | Lang | 226—118 X |

ANDREW R. JUHASZ, Primary Examiner

U.S. Cl. X.R.

83—234, 236, 276; 226—44, 118, 164